(12) United States Patent
Weijand

(10) Patent No.: US 12,155,262 B2
(45) Date of Patent: Nov. 26, 2024

(54) METHOD AND APPARATUS FOR REDUCING THE INRUSH CURRENT OF AN IMPLANTED ELECTRICAL DEVICE

(71) Applicant: Precisis GmbH, Heidelberg (DE)

(72) Inventor: Koen Weijand, L'Alfàs del Pi (ES)

(73) Assignee: Precisis GmbH, Heidelberg (DE)

( * ) Notice: Subject to any disclaimer, the term of this patent is extended or adjusted under 35 U.S.C. 154(b) by 208 days.

(21) Appl. No.: 18/011,960

(22) PCT Filed: Jul. 2, 2021

(86) PCT No.: PCT/EP2021/068349
§ 371 (c)(1),
(2) Date: Feb. 17, 2023

(87) PCT Pub. No.: WO2022/003162
PCT Pub. Date: Jan. 6, 2022

(65) Prior Publication Data
US 2023/0253819 A1 Aug. 10, 2023

(30) Foreign Application Priority Data
Jul. 2, 2020 (DE) .......................... 102020117504.3

(51) Int. Cl.
*H02J 7/34* (2006.01)
*H02J 7/00* (2006.01)
(52) U.S. Cl.
CPC .......... *H02J 7/345* (2013.01); *H02J 7/00304* (2020.01); *H02J 2207/20* (2020.01); *H02J 2310/23* (2020.01)
(58) Field of Classification Search
CPC .... H02J 7/345; H02J 7/00304; H02J 2207/20; H02J 2310/23
See application file for complete search history.

(56) References Cited

U.S. PATENT DOCUMENTS

| | | | |
|---|---|---|---|
| 5,122,724 A * | 6/1992 | Criss ................. | H02M 7/062 361/111 |
| 2004/0169171 A1* | 9/2004 | Reeves ................ | H05C 1/06 256/10 |

(Continued)

FOREIGN PATENT DOCUMENTS

| | | |
|---|---|---|
| DE | 202017100740 U1 | 6/2018 |
| JP | 2016163369 A * | 9/2016 |

OTHER PUBLICATIONS

International Search Report from corresponding International Patent Application No. PCT/EP21/68349, dated Oct. 5, 2021.

(Continued)

*Primary Examiner* — Scott Bauer
(74) *Attorney, Agent, or Firm* — KUSNER & JAFFE

(57) ABSTRACT

The invention relates to a method for reducing the inrush current of an electrical device operated by means of a battery and/or an accumulator, which device is designed as a medical device which can be implanted in a patient and has an electronic circuit which is supplied with electrical energy via at least two supply potential lines, wherein the electronic circuit has a plurality of backup capacitors, each of which is connected or connectable by means of a first terminal to one of the at least two supply potential lines and by means of a second terminal to another of the at least two supply potential lines, wherein the electrical device has an energy management system by means of which one or more parts of the electronic circuit are switched off in an energy-saving mode and are switched on again when the energy-saving mode is exited, wherein the backup capacitors, individually or in a plurality of groups via one switching element per capacitor or group of capacitors, are disconnected from at least one of the supply potential lines in a switched-off state of the switching element and can be connected thereto in a switched-on state of the switching element, wherein the (Continued)

switching elements are switched on with at least a partial time delay relative to one another when the electrical device is switched on and when the circuit parts which are switched off in the energy-saving mode are switched on again.

11 Claims, 4 Drawing Sheets

(56) References Cited

U.S. PATENT DOCUMENTS

2010/0253413 A1* 10/2010 Wu .................. H02H 9/001
  327/401
2015/0229798 A1   8/2015 Otsuka

OTHER PUBLICATIONS

Dini et al., "A Nanocurrent Power Management IC for Low-Voltage Energy Harvesting Sources", IEEE Transactions on Power Electronics, vol. 31, No. 6, Jun. 2016, pp. 4292-4304.

* cited by examiner

METHOD AND APPARATUS FOR REDUCING THE INRUSH CURRENT OF AN IMPLANTED ELECTRICAL DEVICE

FILED OF THE INVENTION

The invention relates to a method for reducing the inrush current of an electrical device. The invention also relates to an electrical device that is designed to connect to a power source.

BACKGROUND OF THE INVENTION

Nowadays, such electrical devices which comprise an electronic circuit are normally equipped with a multiplicity of back-up capacitors, in particular if the electronic circuit is digital, for instance a circuit containing one or more microprocessors or other digital control elements. As a result, the overall electronic circuit can have a relatively high back-up capacitance as a whole. This leads to an increased inrush current during switch-on of the electrical device, because the back-up capacitors have to be charged initially. In many cases, voltages drops can occur in portions of the electronic circuit, in particular if the electrical device is supplied from a power source having a correspondingly high internal resistance.

This can lead to unintended loss of stored data, to overloading or damage to the power source or to an unintended reset, for instance of a microprocessor.

The term back-up capacitor is used in the context of this application for all capacitors that are connected by their first connecting terminal to one of the at least two supply-potential lines, and by their second connecting terminal to at least one other of the at least two supply-potential lines. In this sense, the term back-up capacitor also includes all types of blocking capacitors, filter capacitors, buffer capacitors, decoupling capacitors and bypass capacitors.

Such back-up capacitors have the function of sustaining the voltage across an electronic component, for example digital circuitry, or across any portion of a circuit, and hence of preventing excessive drops in voltage, for instance during switching processes.

There are already proposals for auxiliary circuits that limit the inrush current of such an electrical device. According to such proposals, a transistor or an NTC, for example, is connected in series in a supply-potential line. U.S. Pat. No. 5,122,724 proposes switching on a capacitor slowly through a series-connected field effect transistor by the gradual reduction in the series resistance formed by the field effect transistor.

SUMMARY OF THE INVENTION

Aspects of the present invention provide improved solutions for reducing the inrush current of an electrical device, and to define a corresponding electrical device.

The present invention enables back-up capacitors to be disconnected individually or in a plurality of groups, in each case by means of a switching element, from at least one of the supply-potential lines when the switching element is in an off state, and can be connected thereto when the switching element is in an on state, wherein at least some of the switching elements are switched on mutually staggered in time during switch-on of the electrical device. Thus according to the invention there are a plurality of switching elements, with each switching element assigned to one back-up capacitor or to one group of back-up capacitors. The invention has the advantage that by virtue of the time-staggered switch-on of the switching elements, the inrush current pulse, which otherwise appears simultaneously, concentrated at all the back-up capacitors, can now be distributed over time. This reduces the total maximum inrush current that occurs. Furthermore according to the invention, although limiting the inrush current is not essential, it is also possible to limit the inrush current to a maximum value. The back-up capacitors to be switched by means of the switching elements can be arranged into groups in advance, for instance during the circuit design of the electronic circuit, and the groups can be defined such that the total capacitance of the back-up capacitors in one group is the same, or at least similar, across all the groups. Depending on the embodiment of the back-up capacitors, i.e. their specific capacitance, a group can consist of just one back-up capacitor or of a plurality of back-up capacitors.

The switching element can be any type of switching element, for instance a semiconductor switching element such as a bipolar transistor or a field effect transistor. MOSFETs in particular are advantageous because of their low specific switch-on resistance and their switching characteristics. The back-up capacitors need not necessarily be switched between the binary states "on" and "off" by means of said switching element; intermediate states are also conceivable, for instance temporary operation at an increased junction resistance (e.g. "half on").

The facility to disconnect a back-up capacitor from at least one of the supply-potential lines by means of the switching element comprises both complete disconnection, i.e. galvanic isolation, and disconnection in the sense of a very high-impedance connection or at least a connection of such high impedance that in the disconnected case, the connected back-up capacitors do not cause a significant part of the inrush current during switch-on of the electrical device.

The electrical power source for supplying the electrical device can be, as mentioned, a non-rechargeable and/or rechargeable battery, in particular also an assembly of one or more non-rechargeable batteries and/or one or more rechargeable batteries. The power source can also comprise one or more solar cells, for example. The power source can also comprise a passive power source such as a coil, into which electrical power is coupled inductively and hence without contact. The electrical power source can be part of the electrical device, for example housed in an enclosure of the electrical device. The electrical power source can also be a power source that is separate from the electrical device and is coupled to the electrical device via the supply-potential lines.

The electrical device is a medical device that can be implanted in a patient. The electrical device can be, for example, a stimulation device having stimulation electrodes that can stimulate patient tissues with electrical signals when the electrical device is in operation. For example, it can be a brain stimulation device.

According to an advantageous embodiment of the invention, during switch-on of the electrical device, a first switching element is switched on first, then a second switching element is switched on at a second time offset, and then a third switching element is switched on at a third time offset. The first switching element can be switched on immediately, for example, with the switching-on of the electrical device, or at a first time offset. The inrush current otherwise required for charging the back-up capacitors can thereby be distributed across individual groups of back-up capacitors in a plurality of steps, so that the current load is leveled during switch-on of the electrical device.

It is not necessary for all the back-up capacitors of the electronic circuit to have the facility to disconnect and/or connect by means of such switching elements; at least some back-up capacitors can also be permanently connected to the at least two supply-potential lines. These back-up capacitors are advantageously selected such that they do not cause an inadmissibly high inrush current for the electrical device. It is advantageous in this case to switch on the first switching element in the series of switching elements at a first time offset after switch-on of the electrical device.

According to an advantageous embodiment of the invention, during switch-on of the electrical device, after a switching element is switched on, the next switching element is not switched on until the back-up capacitor switched on by the preceding switching element, or the group of back-up capacitors, has reached a voltage of at least 50% of the potential difference between the at least two supply-potential lines. In this way, the staggered switch-on of the switching elements means waiting out the strongest portion of the charging current curve of the respective back-up capacitors before the next switching element again switches on a back-up capacitor or a group of back-up capacitors. The charging current curve of the back-up capacitors switched-on by the preceding switching element has then already largely decayed away.

The method according to the invention is also suitable in particular for electrical devices which comprise an electronic circuit and which shut down one or more circuit portions, for instance in a power saving mode. In this case, without the method according to the invention, when the circuit portions that are shut down are switched on again, it could happen that, as a result of their back-up capacitors, said circuit portions produce an inadmissibly high inrush current, which could trigger the detrimental effects mentioned in the introduction such as memory data loss, damage to the electrical power source or a microprocessor reset.

It is therefore provided according to the invention that the electrical device comprises power management, by means of which, in a power saving mode, one or more portions of the electronic circuit are shut down, and are switched on again when the power saving mode is exited.

According to an advantageous embodiment of the invention, in the power saving mode, one or more portions of the electronic circuit are in a shut-down state, but at least one portion of the electronic circuit continues to operate. It is thereby possible to realize a low-power mode of the electrical device, in which it can be operated with low electrical power consumption while still being able to implement at least a certain minimum functionality.

The advantages described above can also be realized by an electrical device having control logic. The control logic can be in the form of a separate electrical or electronic circuit, or can be part of the electronic circuit of the device, or part of power management. The control logic can be formed from passive and/or active electronic components. The active electronic components can also include a microprocessor or a similar processor. According to an advantageous embodiment of the invention, the control logic is designed to implement a method of the type described above. The control logic can accordingly be designed to switch on mutually staggered in time at least some of the switching elements during switch-on of the electrical device.

According to an advantageous embodiment of the invention, the control logic comprises one time delay element for each control terminal, which time delay elements have the same or different time delay values. Such a time delay element can have a signal output, via which a switch-on signal is emitted to the control terminal of an associated switching element in order to switch on said switching element. The time delay elements can be triggered, for example, by a switch-on signal of the electrical device, for instance by the rise in the potential difference between the at least two supply-potential lines. If the time delay elements have the same time delay values, it is advantageous to select different trigger thresholds for triggering the time delay element, or to apply time-staggered trigger signals to these time delay elements.

According to an advantageous embodiment of the invention, the time delay elements of at least a plurality of control terminals are connected in a row one after the other, so that the time delay values of the time delay elements are added together from one control terminal to the next. It is thereby possible particularly advantageously to stagger in time the switch-on of the different switching elements even though the time delay elements have the same time delay values. Basically, a time delay element is thereby triggered by the signal output of the preceding time delay element.

According to an advantageous embodiment of the invention, one, a plurality, or all of the time delay elements are each in the form of an RC element having at least one resistance and at least one capacitance, which capacitance is a parasitic capacitance of a semiconductor switch forming a switching element. The control logic can thereby be realized particularly simply and with minimum circuit complexity. The individual control terminals of the switching elements can be connected one after the other to the individual connection points of a series circuit of resistances. In this way, each of the time delay elements is formed as an RC element. Field effect transistors, the gate capacitance of which is used as the parasitic capacitance, in particular are suitable for realizing control logic of this type. MOSFETs of older design are particularly suitable because they have a relatively large gate-drain capacitance. The gate-drain capacitance has a strong influence on the input capacitance. The rising gate-drain voltage then causes a delay to the switch-on.

BRIEF DESCRIPTION OF THE DRAWINGS

The invention is explained in more detail below with reference to exemplary embodiments using drawings, in which.

DETAILED DESCRIPTION OF THE INVENTION

Figure 1:
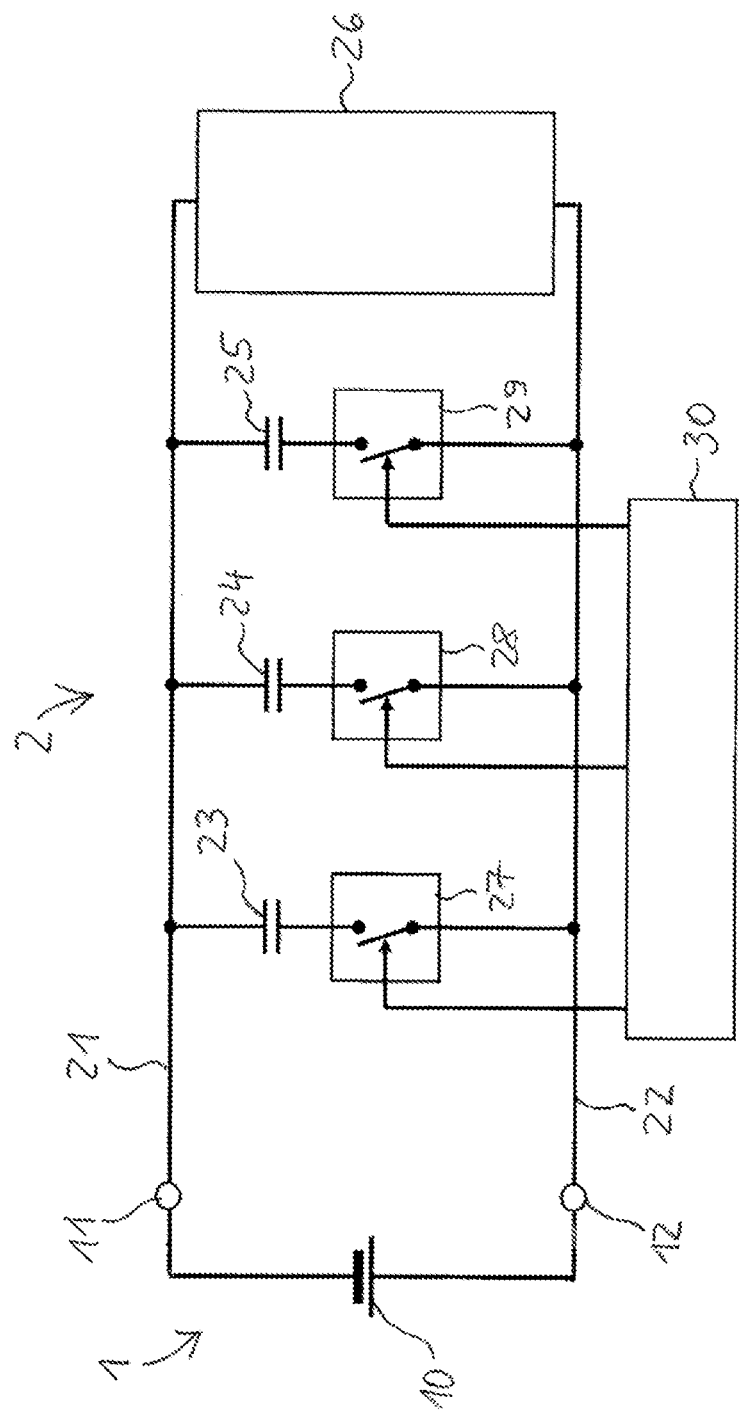
FIG. 1 shows an electrical device in a first embodiment.

FIG. 1 shows an electrical device 2, which is connected to an electrical power source 1. For example, the electrical power source 1 comprises a non-rechargeable or rechargeable battery 10. The electrical device 2 comprises an electronic circuit, of which only a circuit portion 26 is shown for simplicity. This circuit portion 26 comprises three back-up capacitors 23, 24, 25 by way of example. The electronic circuit can comprise a plurality of such or similar circuit portions, each having dedicated back-up capacitors.

The electronic circuit is connected by connecting terminals 11, 12 to the power source 1 via two supply-potential lines 21, 22. A first supply-potential line 21 can be, for example, a battery voltage line carrying a potential of the battery 10; a second supply line 22 can be a ground line. The capacitors shown here as single back-up capacitors 23, 24, 25 can also be realized in the form of a plurality of single capacitors, and therefore the back-up capacitors 23, 24, 25 can also each represent a group of back-up capacitors.

Figure 2:
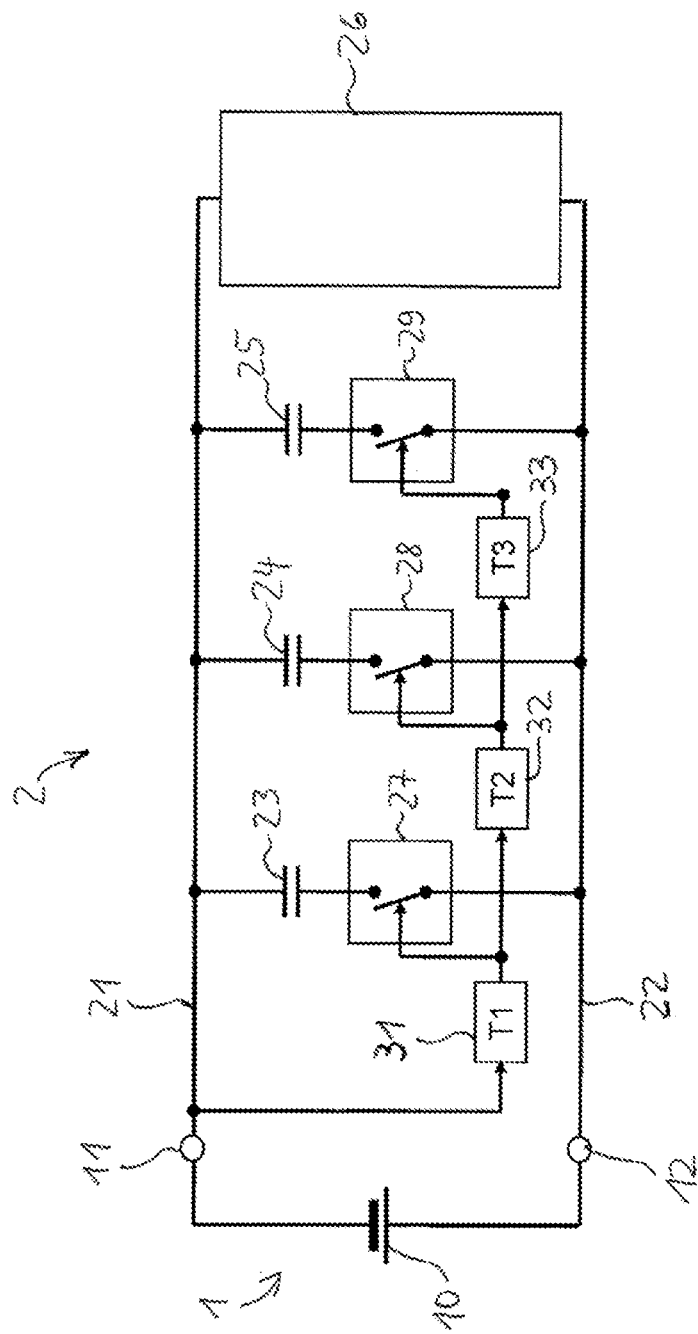
FIG. 2 shows an electrical device in a second embodiment.

Each of the back-up capacitors 23, 24, 25 is connected, or can be connected, by one connecting terminal thereof to the first supply-potential line 21, and by the other connecting terminal thereof to the second supply-potential line 22. Connected in series with each back-up capacitor 23, 24, 25 is an associated controllable switching element 27, 28, 29. FIG. 2 shows the respective switching elements 27, 28, 29 arranged on the side of the second supply potential of the associated back-up capacitor 23, 24, 25, although the respective switching elements could also be connected on the other side, i.e. on the side of the first supply potential. The crucial factor is that the connection of the back-up capacitor 23, 24, 25 can be disconnected from at least one of the supply-potential lines 21, 22 by means of the associated switching element 27, 28, 29 in order to achieve the reduction according to the invention in the inrush current of the electrical device.

The switching elements 27, 28, 29 each have respective control terminals, which are connected to control logic 30. The control logic 30 is designed to emit switch-on signals to the control terminals of the switching elements 27, 28, 29 in order to bring them into the switched-on state. The control logic 30 is configured such that these switch-on signals for the individual switching elements 27, 28, 29 are emitted mutually staggered in time, so that the switch-on of the back-up capacitors 23, 24, 25 is also staggered in time, at least during switch-on of the electrical device 2. The control logic 30 can be realized in the most varied of ways, for instance by a control processor, a plurality of individual time delay elements, or the like.

FIG. 2 shows an electrical device 2 having an associated power source 1 in a similar design to FIG. 1, but, unlike FIG. 1, the control logic 30 is specifically in the form of time delay elements 31, 32, 33. Each time delay element 31, 32, 33 has a trigger input. If the time delay element detects a trigger signal at the trigger input, after a specific delay time, i.e. a time delay value T1, T2, T3 specific to the particular time delay element, a switch-on signal is emitted to the control terminal of the associated switching element 27, 28, 29 at a signal output of the time delay element.

The signal output of the time delay element 31 is connected to the control terminal of the switching element 27. The signal output of the time delay element 32 is connected to the control terminal of the switching element 28. The signal output of the time delay element 33 is connected to the control terminal of the switching element 29. The figure also shows that the time delay elements 31, 32, 33 are connected in a row one after the other. The trigger input of the first time delay element 31 is connected, for example, to the first supply-potential line 21. If the potential at the first supply-potential line 21 reaches a certain trigger value, which the first time delay element 31 detects as a trigger signal, this time delay element performs the mentioned emission of the switch-on signal at the signal output after the time delay value T1 has elapsed. The trigger input of the second time delay element 32 is connected to the signal output of the first time delay element 31. Therefore the second time delay element 32 cannot be triggered until the time delay of the first time delay element 31 has elapsed. The second time delay element 32 implements a time delay with its time delay value T2. After this time delay has elapsed, the switch-on signal is emitted at the signal output of the second time delay element 32. The trigger input of the third time delay element 33 is connected to the signal output of the second time delay element 32. Therefore the third time delay element 33 is first triggered by the switch-on signal emitted by the second time delay element. After this triggering, the third time delay element 33 implements a time delay with its time delay value T3. Thereafter, the switch-on signal is emitted to the third switching element 29.

Hence the first back-up capacitor 23 is switched on after the time delay T1, the second back-up capacitor 24 after the time delay T1+T2, and the third back-up capacitor after the time delay T1+T2+T3.

Figure 3:
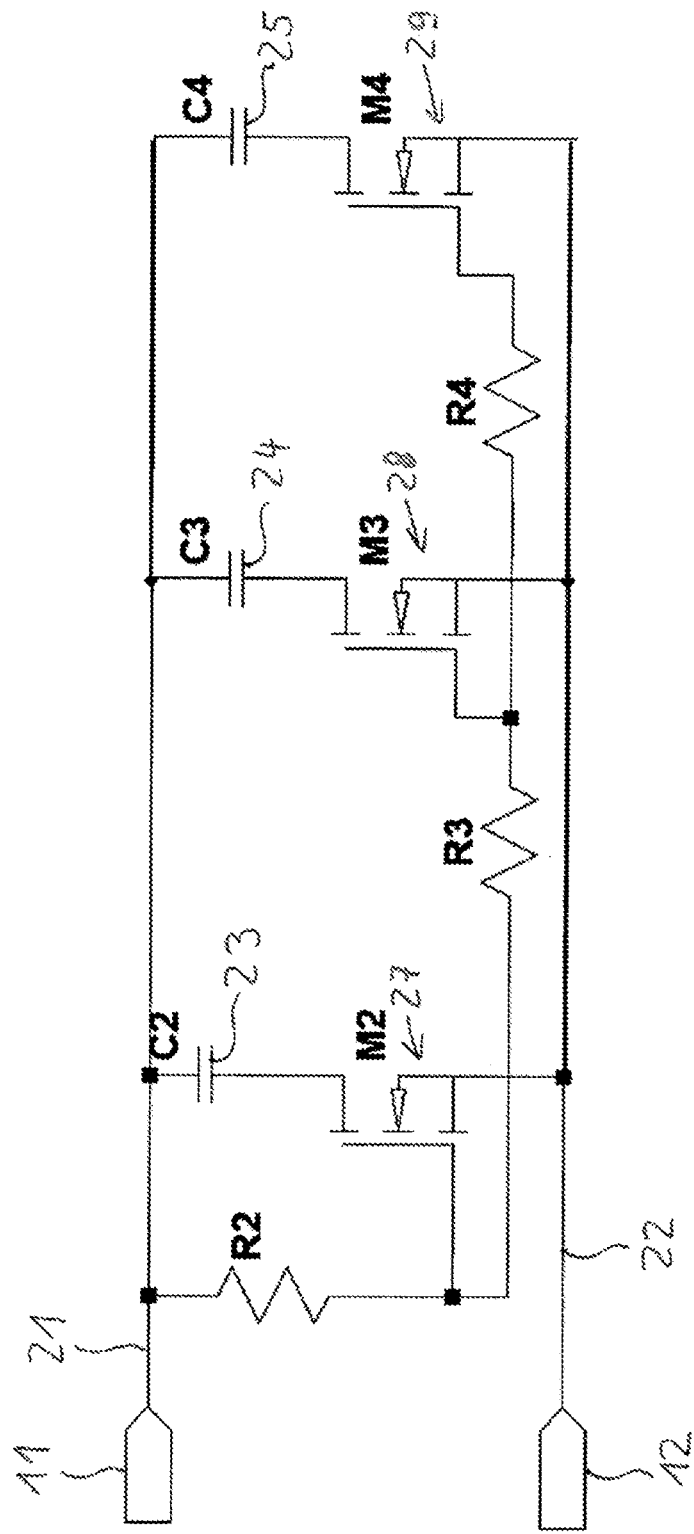
FIG. 3 shows an electrical device in a third embodiment.

FIG. 3 shows an embodiment of the electrical device for which the chain of time delay elements 31, 32, 33 shown in FIG. 2 is realized particularly favorably in circuitry by cascading RC elements. The C element of a first RC element that corresponds to the first time delay element 31 is formed by the gate-source capacitance and the gate-drain capacitance of a transistor M2 that forms the first switching element 27. The gate-source capacitance is dominant. The resistance of this RC element is formed by a resistor R2.

The C element of a second RC element that corresponds to the second time delay element 32 is formed by the gate-source capacitance and the gate-drain capacitance of a transistor M3 that forms the second switching element 28. The gate-source capacitance is dominant. The resistance of this RC element is formed by a resistor R3. The C element of a third RC element that corresponds to the third time delay element 33 is formed by the gate-source capacitance and the gate-drain capacitance of a transistor M4 that forms the third switching element 29. The gate-source capacitance is dominant. The resistance of this RC element is formed by the resistor R4. It is apparent that the entire control logic or the time delay elements for controlling the control terminals of the switching elements 27, 28, 29 can be formed by a simple series circuit of one resistor per switching element.

The described exemplary embodiments each show the circuit arrangement having three back-up capacitors and three associated switching elements. It is obviously possible to increase and reduce the number of back-up capacitors or groups of back-up capacitors and their switching elements as required according to the specific use.

Figure 4:
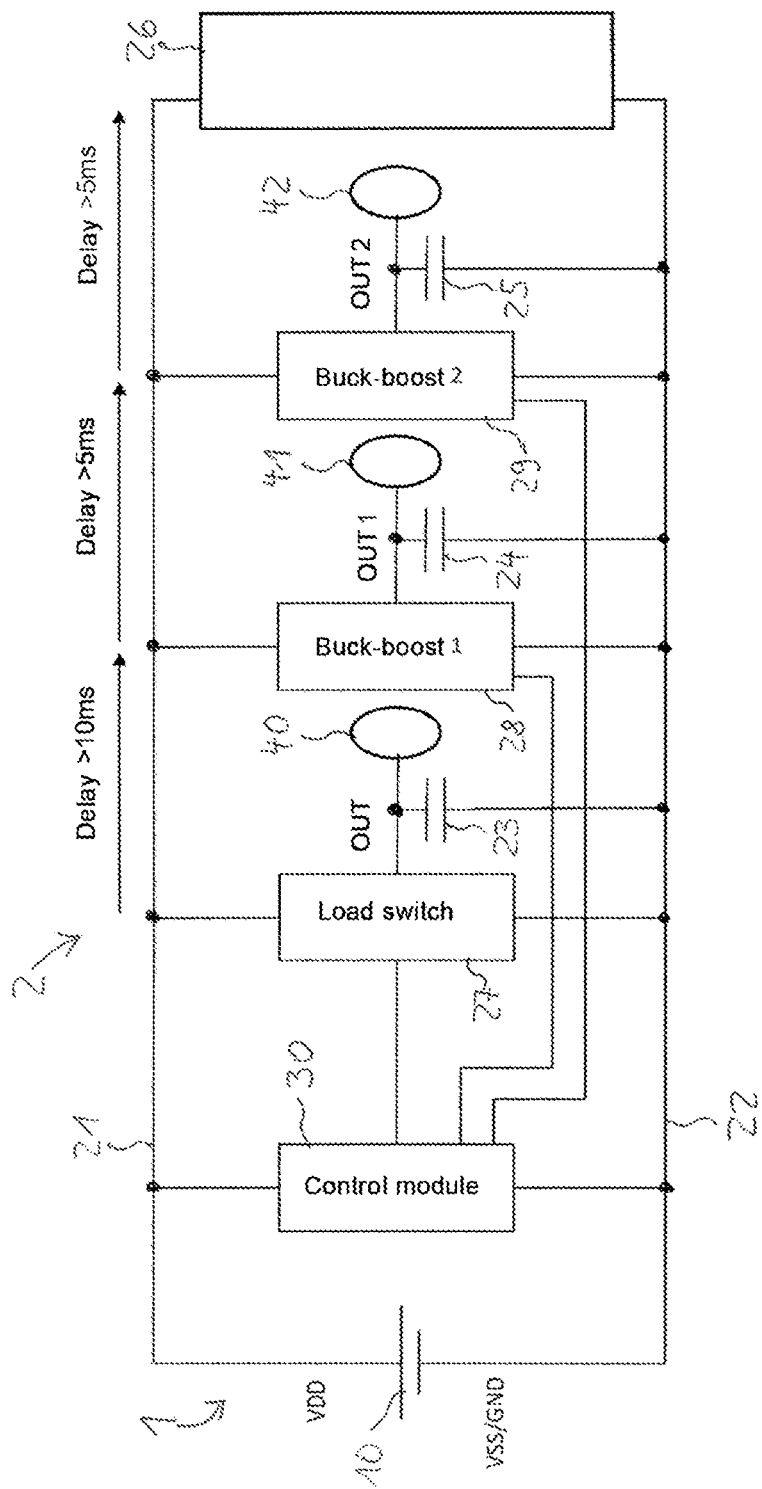
FIG. 4 shows an electrical device in a fourth embodiment.

The exemplary embodiment shown in FIG. 4 is similar to the embodiment of FIG. 1 in the sense that a central controller 30 for time-staggered actuation of the switching elements 27, 28, 29 is present, for example in the form of a control module. Corresponding control lines of the control module are connected to the respective control terminals of the switching elements 27, 28, 29. Assigned to the switching elements 27, 28, 29 are respective portions 40, 41, 42 of the electronic circuit of the device 2, which can be switched on by means of the respective switching elements 27, 28, 29. The portion 40 can be switched on by means of the switching element 27, the portion 41 by means of the switching element 28, and the portion 42 by means of the switching element 29. For example, the switching element 27 is embodied as an electronic switch, for instance in the form of a switching transistor. Specifically for realizing an electrical device in the form of an implantable medical device are present as further switching elements 28, 29 respective buck-boost circuit arrangements, by means of which can be produced from the voltage provided by the non-rechargeable or rechargeable battery 10 higher voltages, both positive and negative voltages. For example, the buck-boost circuit arrangements can be used to produce high stimulation voltages for electrical stimulation procedures on patients. For instance the buck-boost circuits can provide a positive and a negative stimulation voltage, or stimulation voltages of the same polarity and different amplitude.

The exemplary embodiment shown in FIG. 4 also shows that the delay values can have different values in the individual delay stages, something that also applies to the other exemplary embodiments. For example, the first switching element 27 can cause a delay of at least 10 ms, the second switching element 28 a subsequent additional delay of at least 5 ms, and the subsequent third switching element 29 a subsequent further delay of at least 5 ms.

What is claimed is:

1. A method for reducing the inrush current of an electrical device that is powered by a non-rechargeable battery and/or rechargeable battery and is in the form of a medical device that can be implanted in a patient, and which comprises an electronic circuit which is supplied with electrical power via at least two supply-potential lines, which electronic circuit comprises a plurality of back-up capacitors, each of which is connected, or can be connected, by a first connecting terminal to one of the at least two supply-potential lines and by a second connecting terminal to another of the at least two supply-potential lines, wherein the electrical device comprises power management, by means of which, in a power saving mode, one or more portions of the electronic circuit are shut down, and are switched on again when the power saving mode is exited, wherein the back-up capacitors can be disconnected individually or in a plurality of groups, in each case by means of a switching element, from at least one of the supply-potential lines when the switching element is in an off state, and can be connected thereto when the switching element is in an on state, wherein at least some of the switching elements are switched on mutually staggered in time during switch-on of the electrical device and during switching-on again of the circuit portions shut down in the power saving mode.

2. The method as claimed in claim 1, wherein during switch-on of the electrical device, a first switching element is switched on first, then a second switching element is switched on at a second time offset, and then a third switching element is switched on at a third time delay.

3. The method as claimed in claim 1, wherein during switch-on of the electrical device, after a switching element is switched on, the next switching element is not switched on until the back-up capacitor switched on by the preceding switching element, or the group of back-up capacitors, has reached a voltage of at least 50% of the potential difference between the at least two supply-potential lines.

4. The method as claimed in claim 1, wherein in the power saving mode, one or more portions of the electronic circuit are in a shut-down state, but at least one portion of the electronic circuit continues to operate.

5. An electrical device configured to connect to a power source and is in the form of a medical device that is powered by a non-rechargeable and/or rechargeable battery and configured to be implanted in a patient, which electrical device comprises an electronic circuit which configured to be supplied with electrical power from the power source via at least two supply-potential lines, which electronic circuit comprises a plurality of back-up capacitors, each of which is connected, or can be connected, by a first connecting terminal to one of the at least two supply-potential lines and by a second connecting terminal to another of the at least two supply-potential lines, wherein the back-up capacitors are configured to be disconnected individually or in a plurality of groups, in each case by means of a switching element, from at least one of the supply-potential lines when the switching element is in an off state, and configured to be connected thereto when the switching element is in an on state, wherein the switching elements have control terminals, which are connected to control logic for controlling the switch-on of the switching elements, wherein the electrical device comprises power management, by means of which, in a power saving mode, one or more portions of the electronic circuit are shut down, and are switched on again when the power saving mode is exited.

6. The electrical device as claimed in claim 5, wherein the control logic is designed to implement a method as claimed in claim 1.

7. The electrical device as claimed in claim 5, wherein the control logic comprises one time delay element for each control terminal, which time delay elements have the same or different time delay values.

8. The electrical device as claimed in claim 7, wherein the time delay elements of at least a plurality of control terminals are connected in a row one after the other, so that the time delay values of the time delay elements are added together from one control terminal to the next.

9. The electrical device as claimed in claim 7, wherein one, a plurality, or all of the time delay elements (31, 32, 33) are each in the form of an RC element having at least one resistance and at least one capacitance, which capacitance is a parasitic capacitance of a semiconductor switch forming a switching element.

10. The electrical device as claimed in claim 5, wherein portions of the electronic circuit are configured to be shut down by means of the respective switching elements, and configured to be switched on again mutually staggered in time by means of the respective switching elements when the power saving mode is exited.

11. The electrical device as claimed in claim 10, wherein of the electronic circuit is configured to be supplied by means of the respective switching elements with different operating voltages.

* * * * *